(12) United States Patent
Tucker (10) Patent No.: US 12,046,235 B2
(45) Date of Patent: Jul. 23, 2024

(54) UNMUTED MICROPHONE NOTIFICATION

(71) Applicant: Lenovo (Singapore) Pte. Ltd., Singapore (SG)

(72) Inventor: Matthew Tucker, Chapel Hill, NC (US)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 265 days.

(21) Appl. No.: 17/388,483

(22) Filed: Jul. 29, 2021

(65) Prior Publication Data

US 2023/0036921 A1    Feb. 2, 2023

(51) Int. Cl.
| | |
|---|---|
| *G10L 15/00* | (2013.01) |
| *G08B 21/18* | (2006.01) |
| *G10L 15/02* | (2006.01) |
| *G10L 15/22* | (2006.01) |
| *G10L 25/51* | (2013.01) |
| *G10L 15/08* | (2006.01) |
| *G10L 15/18* | (2013.01) |
| *G10L 17/06* | (2013.01) |

(52) U.S. Cl.
CPC ............ *G10L 15/22* (2013.01); *G08B 21/182* (2013.01); *G10L 15/02* (2013.01); *G10L 25/51* (2013.01); *G10L 15/08* (2013.01); *G10L 15/1815* (2013.01); *G10L 17/06* (2013.01)

(58) Field of Classification Search
CPC ......... G10L 15/07; G10L 15/20; G10L 15/22; G10L 15/30; G10L 15/26; G10L 15/02; G10L 15/063; G10L 15/08; G10L 15/187; G10L 15/04; G10L 15/14; G10L 17/00; G10L 17/02; G10L 17/04; G10L 17/06; G10L 17/14; G10L 17/16; G10L 17/26; G10L 15/197; G10L 21/0208; G10L 25/87; G10L 15/1822; G10L 15/183; G10L 15/19; G10L 15/193
See application file for complete search history.

(56) References Cited

U.S. PATENT DOCUMENTS

| | | | | |
|---|---|---|---|---|
| 9,037,455 | B1 * | 5/2015 | Faaborg ................. | G10L 21/00 704/251 |
| 9,792,913 | B2 * | 10/2017 | Li ........................... | G06F 21/32 |
| 11,170,784 | B2 * | 11/2021 | Truong .................... | G06N 5/04 |
| 11,275,853 | B2 * | 3/2022 | Talib ....................... | G06F 40/35 |
| 11,522,994 | B2 * | 12/2022 | Ramsue .................. | G10L 17/06 |
| 2014/0358520 | A1 * | 12/2014 | Davey ..................... | G10L 15/08 704/9 |

* cited by examiner

*Primary Examiner* — Vu B Hang
(74) *Attorney, Agent, or Firm* — Ference & Associates LLC (57) ABSTRACT

One embodiment provides a method, including: receiving, at an input device associated with an information handling device, audio input; determining, using a processor, that an audible anomaly exists in the audio input, wherein the audible anomaly corresponds to a deviation from an established speech input pattern of a user; and performing, responsive to determining that the audible anomaly exists in the audio input, a remedial action to address the audible anomaly. Other aspects are described and claimed.

18 Claims, 3 Drawing Sheets

UNMUTED MICROPHONE NOTIFICATION

BACKGROUND

Individuals frequently interact with their information handling devices ("devices"), for example, smart phones, tablet devices, laptop and/or personal computers, and the like using voice inputs. For example, voice input from an individual may be detected by an audio capture device (e.g., a microphone, etc.) and may thereafter be transmitted to one or more other individuals (e.g., in a conventional phone conversation, in a conferencing application, etc.). To prevent the transmission of the audio to others, an individual may activate a mute control (e.g., on their input device, on their computing device, on a conferencing application on their device, etc.)

BRIEF SUMMARY

In summary, one aspect provides a method, including: receiving, at an input device associated with an information handling device, audio input; determining, using a processor, that an audible anomaly exists in the audio input, wherein the audible anomaly corresponds to a deviation from an established speech input pattern of a user; and performing, responsive to determining that the audible anomaly exists in the audio input, a remedial action to address the audible anomaly.

Another aspect provides an information handling device, including: an audio input device; a processor; a memory device that stores instructions executable by the processor to: receive audio input; determine that an audible anomaly exists in the audio input, wherein the audible anomaly corresponds to a deviation from an established speech input pattern of a user; and perform, responsive to determining that the audible anomaly exists in the audio input, a remedial action to address the audible anomaly.

A further aspect provides a product, including: a storage device that stores code, the code being executable by a processor and comprising: code that receives audio input; code that determines that an audible anomaly exists in the audio input, wherein the audible anomaly corresponds to a deviation from an established speech input pattern of a user; and code that performs, responsive to determining that the audible anomaly exists in the audio input, a remedial action to address the audible anomaly.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As technology has progressed, the prevalence and feasibility of remote working solutions has correspondingly increased. More particularly, a greater number of individuals than ever before are able to effectively work from home or from another remote location. In these environments, it is not uncommon for individuals to engage in a multitude of calls or conferences with others throughout the day (e.g., calls with other individuals, online meetings with a small group, a teleconference with a large number of people, etc.).

In various circumstances, individuals may not want audio in their proximate environment to be transmitted to others. For instance, while on a conference call an individual may simultaneously be: performing a noisy task (e.g., filling their glass with ice cubes, etc.), talking to others (e.g., their family members, etc.), or otherwise be in a generally noisy environment, etc. Inevitably, situations arise where individuals believe that their input audio is muted when it actually isn't. When speech or noise not intended for the call is broadcast, this can lead to an extremely embarrassing situation for the individual and/or may be very disruptive for others on the call in general.

Existing solutions to address the foregoing largely revolve around visual indicators that may inform an individual that a mute control is active. For example, when a mute control is activated an individual may see: a standing "muted" notification on their display screen, an on-screen icon such as a microphone positioned within a circle-backslash, a change to the color in hardware LEDs, a combination thereof, and the like. Occasionally, however, an individual may forget to check if they are muted or not before making noise. Additionally, sometimes a mute status may dynamically change over time (e.g., a mute control may have been activated the last time an individual was logged into a device but may no longer be active the next time they log into the device, etc.). Further complicating the matter is the presence of redundant mute functionality. More particularly, a mute control may be activated on the input device itself (e.g., on the microphone, etc.), on the computer hardware, and/or at the application level. Individuals may believe they are effectively muted because they have a mute control active at one component but may not realize that the mute control on another component is the predominant mute control, leading to their input audio being unintentionally broadcast.

Accordingly, an embodiment provides a method for dynamically performing a remedial action to address a detected anomaly present in received audio input. In an embodiment, audio input may be received at an input device (e.g., a microphone, etc.) associated with a computing device. An embodiment may then determine whether an audible anomaly exists in the audio input. In this regard, an embodiment may identify how certain characteristics of the audio input (e.g., nature of the audio input, user providing the audio input, volume of the audio input, tone of the audio input, specific vocabulary used in the audio input, etc.) compare with an established speech pattern of a known user. If an embodiment determines that a discrepancy exists, an embodiment may perform a remedial action (e.g., provide a notification to a user, dynamically activate a mute control, etc.). Such a method may ensure that undesired/irrelevant audio is not unintentionally transmitted to others.

The illustrated example embodiments will be best understood by reference to the figures. The following description is intended only by way of example, and simply illustrates certain example embodiments.

Figure 1:
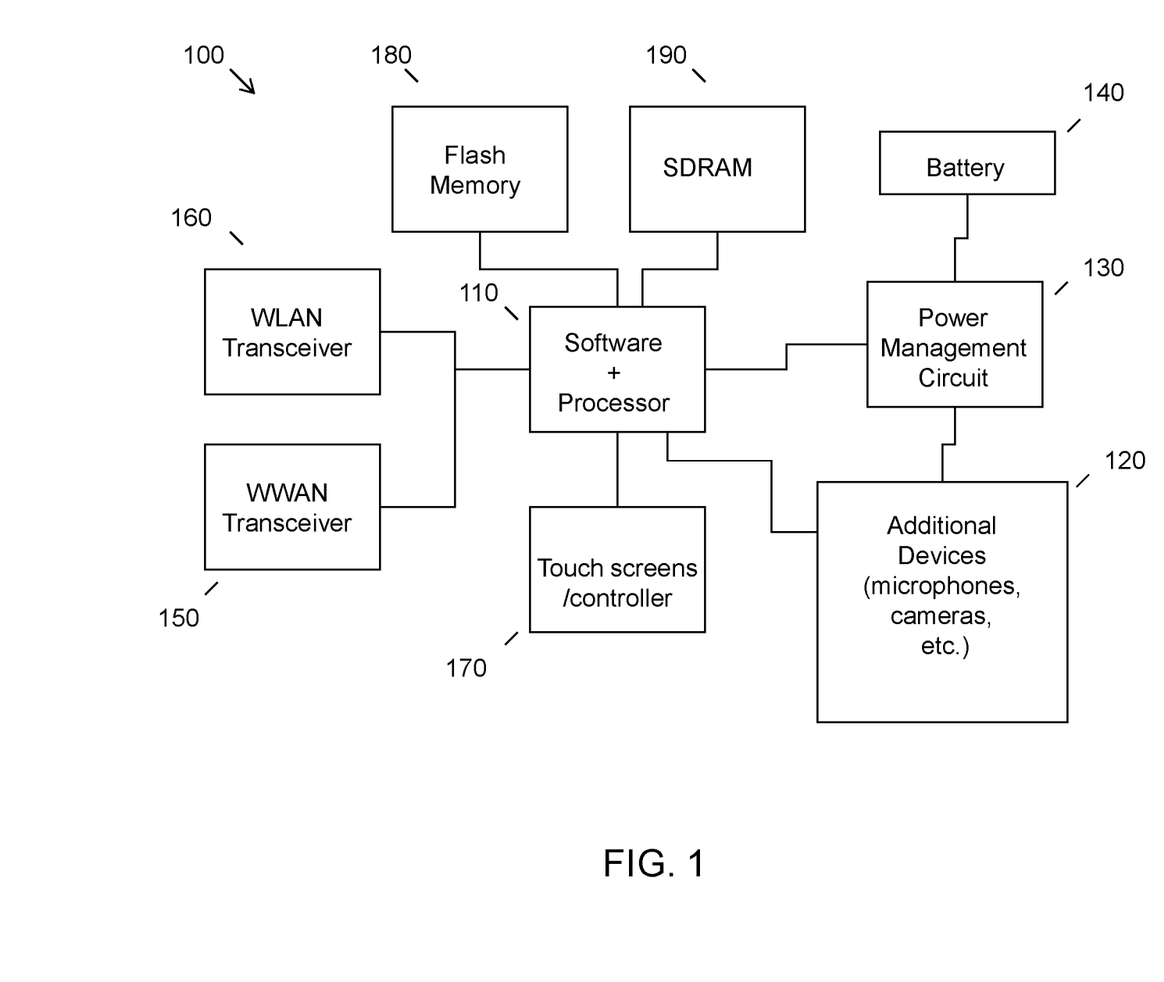
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, etc. System 100 often includes one or more touch screens 170 for data input and display/rendering. System 100 also typically includes various memory devices, for example flash memory 180 and SDRAM 190.

Figure 2:
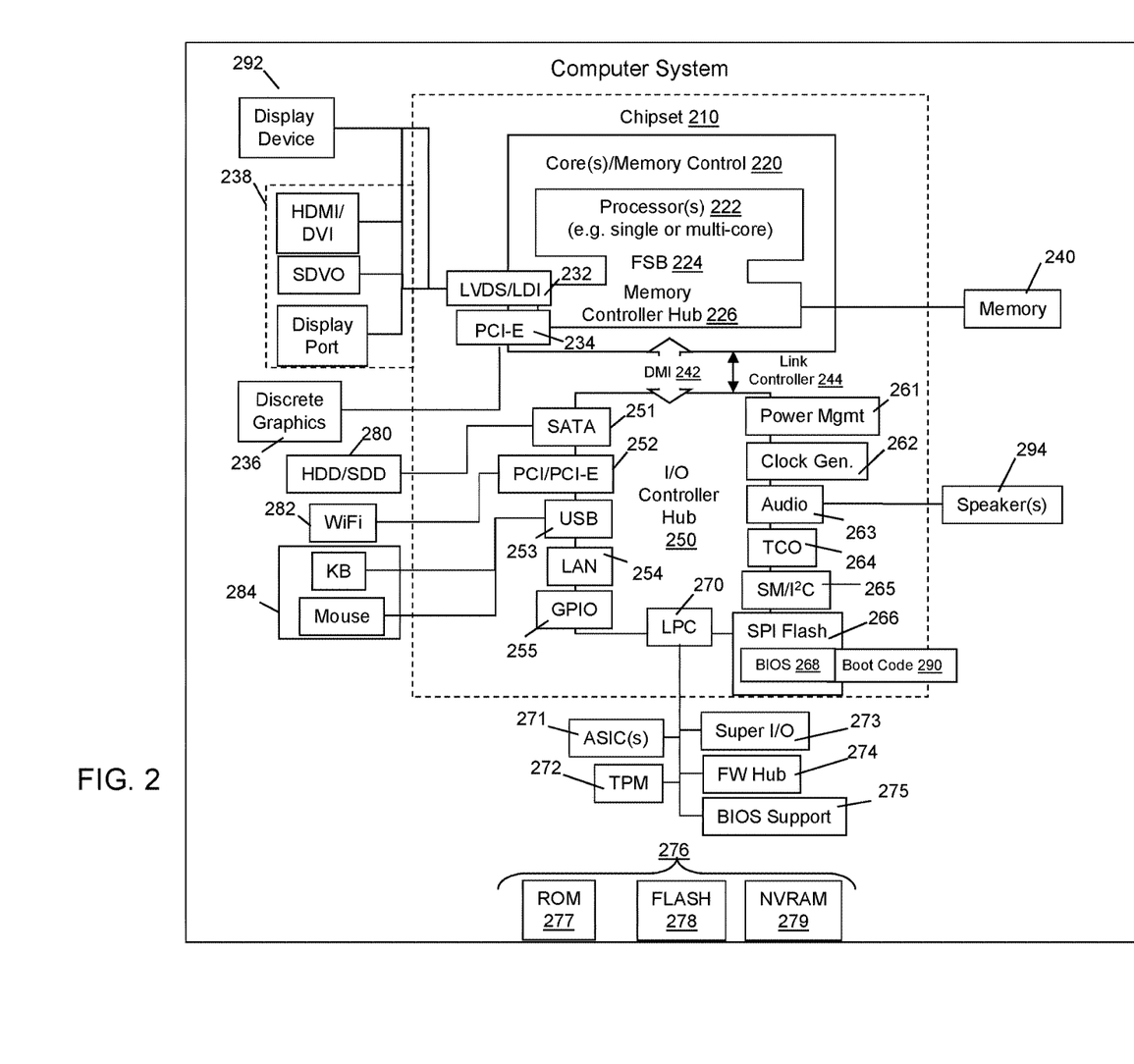
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, NC, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling circuitry, as for example outlined in FIG. 1 or FIG. 2, may be used in devices that are capable of capturing, processing, and/or transmitting audio input to others. For example, the circuitry outlined in FIG. 1 may be implemented in a smart phone or tablet embodiment, whereas the circuitry outlined in FIG. 2 may be implemented in a laptop or personal computer.

Figure 3:
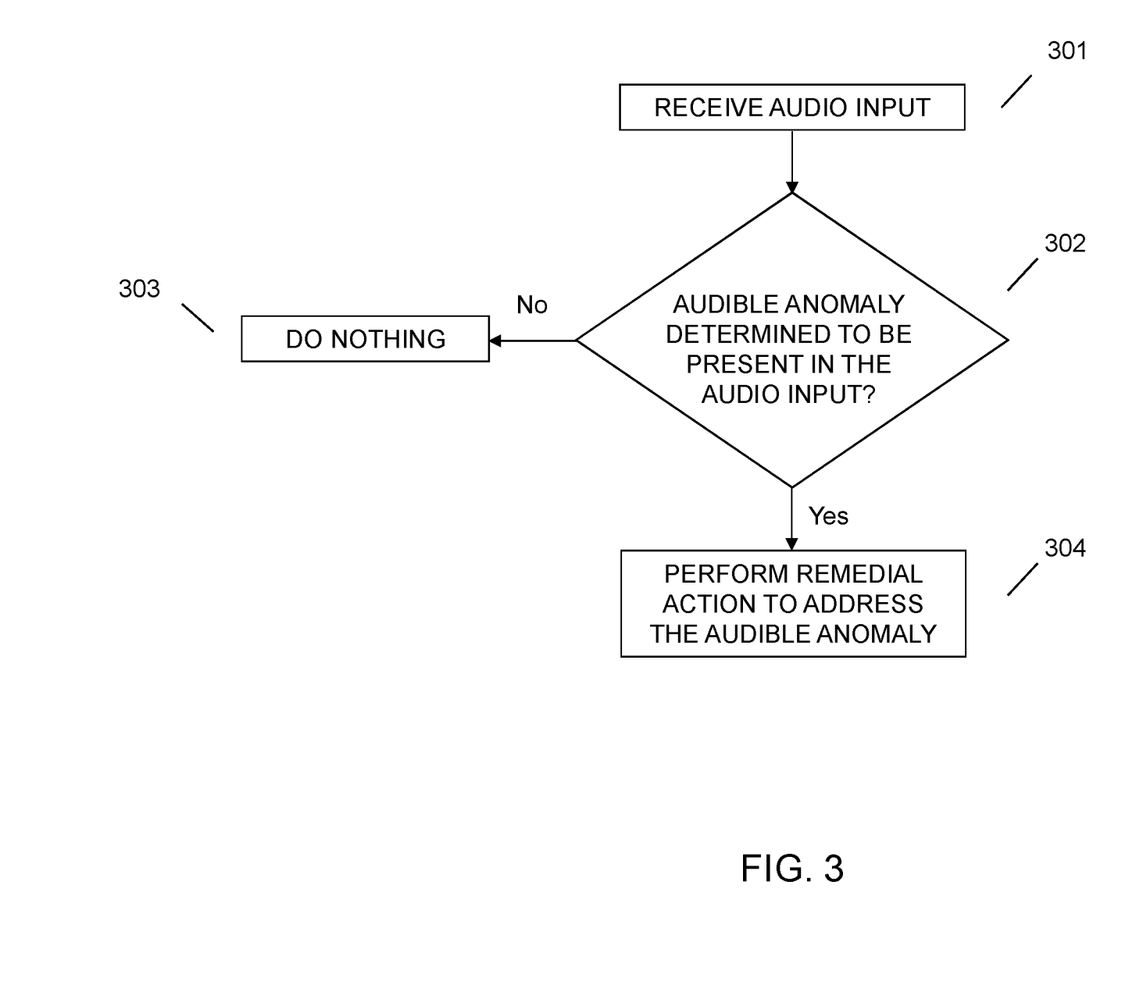
FIG. 3 illustrates an example method of performing a remedial action to address an audible anomaly in received audio input.

Referring now to FIG. 3, an embodiment provides a method of performing a remedial action to address an audible anomaly present in the received audio input. At 301, an embodiment may detect or receive audio input. In an embodiment, the audio input may be received at an audible input device (e.g., a microphone, etc.) integrally or operatively coupled to a device. The audible input device may be an always-on device (e.g., programmed to continuously monitor for audio input, etc.) or may be configured to activate in response to a predetermined event (e.g., when the primary computing device is turned on, when a particular application is activated on the primary computing device, when a user is detected to be in proximity to the primary computing device, etc.).

At 302, an embodiment may determine that an audible anomaly exists in the audio input. In the context of this application, an audible anomaly may correspond to a deviation of the received audio input from an established speech input pattern for a user. In an embodiment, the user may be an authorized user that is associated with a particular device, a particular user profile on the device, or a particular user profile on an application active on the device. In an embodiment, the speech pattern for the authorized user may be established during a dedicated training period (e.g., a period of time during which a user is asked to provide various types of audio inputs, etc.) or may be established gradually over time (e.g., by analyzing a user's speech input characteristics across various calls, etc.).

A plurality of various types of techniques are described below that may be employed to determine whether an audible anomaly exists in the received audio input. These techniques may be used alone or in combination with one another to provide additional confirmation of the presence or absence of an audible anomaly in the audio input.

In an embodiment, the determination of whether an audible anomaly exists may be facilitated by determining whether the audio input comprises human speech or non-speech noise. More particularly, an embodiment may first identify audible characteristics of the audio input by analyzing the audio input using one or more conventional audio analysis techniques known in the art. An embodiment may then identify that aspects of the audio input are not common to those characteristics known to be associated with conventional human speech. Additionally or alternatively, an embodiment may compare the characteristics of the audio input to a database of sounds (e.g., stored locally on the device or remotely on another device or server, etc.) associated with common noises in a user's environment. If an embodiment identifies that one or more matches exist, a conclusion can be made that the audio input contains at least some non-speech noise.

In an embodiment, the determination of whether an audible anomaly exists may be facilitated by determining whether the audio input contains input provided by an authorized user or input provided by one or more other individuals. An embodiment may first identify audible characteristics of the audio input by analyzing the audio input using one or more conventional audio analysis techniques known in the art. An embodiment may then compare the identified characteristics of the audio input to known audible characteristics of an authorized user's speech pattern. If an embodiment determines that the characteristics of the received audio input do not contain a predetermined level of similarity with the authorized user's speech pattern (e.g., a ninety percent degree of similarity or more, etc.) then an embodiment may conclude that the audio input contains speech provided by other individuals.

In an embodiment, the determination of whether an audible anomaly exists may be facilitated by determining whether the specific vocabulary utilized in the audio input and/or the frequency with which certain words are uttered corresponds to those words commonly uttered in an established speech pattern associated with an authorized user. An embodiment may first identify the specific words uttered in the audio input as well as their frequency (e.g., via leveraging one or more conventional audio analysis techniques known in the art, etc.). An embodiment may then access a database containing common words that are conventionally uttered by an authorized user as part of their normal speech input pattern. This database may be continually updated with data obtained from each successive call a user is engaged in. An embodiment may then assign a point value to one or more particular words in a sentence (e.g., to some or all nouns, verbs, adjectives, pronouns, etc.) based upon their commonality with the known common words in the speech input pattern (e.g., uncommon words are assigned a lower score than common words, etc.). If the resulting score is less than a predetermined threshold score, an embodiment may conclude that an audible anomaly exists.

In addition to the foregoing, to further provide confirmation that an audible anomaly does or does not exist an embodiment may also process the speech from all other participants/attendees on a call. This processed conference speech data may be organized into a call-specific vocabulary reference. Such a reference may act as a check to determine if certain words, which may be different than what a particular user normally utters, are still intended to be broadcast based upon their contextual relevance to the subject matter of the call (i.e., as determined by the call-specific vocabulary reference). In an embodiment, each sentence spoken by the user is compared to both, the call-specific vocabulary reference and the established speech pattern data associated with the user, and assigned a separate score for each comparison. The combined total of this score may be referenced to determine whether the speech input was relevant or not to the conversation.

In an embodiment, the determination of whether an audible anomaly exists may be facilitated by determining whether a volume level of the audio input is consistent with a volume range at which an authorized user conventionally provides audio input. An embodiment may first identify a volume level of the audio input and compare that identified volume level to a volume range in a user's established speech pattern. If the volume level of the audio input falls outside of the volume range in the established speech pattern (e.g., above the volume range indicating that the volume level of the audio input is abnormally high, below the volume range indicating that the volume level of the audio input is abnormally low, etc.), an embodiment may conclude that an audible anomaly exists. In an embodiment, additional contextual metrics (e.g., position data, time of day data, proximate individual data, etc.) detectable by the system may be referenced to select an appropriate volume range against which the volume level of the audio input is compared. For example, an embodiment having access to position data of a user may identify that a user is presently in a conventionally loud area (e.g., a shopping mall, etc.). With this knowledge at hand, an embodiment may dynamically increase a top end of the volume range in anticipation that the volume level of the audio input may be higher (e.g., a user may speak louder to talk over the noise of the proximate area, etc.).

In an embodiment, the determination of whether an audible anomaly exists may be facilitated by determining whether a tone of speech present in the audio input is consistent with a tone in an authorized user's speech pattern. An embodiment may first identify the tone of the human speech in the audio input (e.g., by utilizing one or more conventional audio analysis techniques known in the art, etc.) and thereafter compare this tone to the tone in the authorized user's speech pattern. If an atypical tone is identified, an embodiment may conclude that an audible anomaly exists.

In an embodiment, if multiple of the previously described techniques indicate that an audible anomaly exists, an embodiment may have higher confidence in its determination. Additionally, various other metrics, not explicitly described here, may also be utilized to increase an embodiments' confidence in its determination. As a non-limiting example, eye tracking technology may be employed to identify a direction or pattern of user's gaze, which may be helpful in identifying whether a user is intending to provide speech input to the device or to another outside source (e.g., another individual, etc.).

Responsive to determining, at 302, that no audible anomaly exists in the audio input (i.e., that the characteristics of the audio input are substantially consistent with those characteristics of the established speech input pattern), then an embodiment may, at 303, take no additional action. Conversely, responsive to determining, at 302, that an audible anomaly does exist in the audio input, an embodiment may, at 304, perform a remedial action to address the audible anomaly. In an embodiment, the performance of the remedial action may occur automatically without the receipt of any additional user input.

In an embodiment, a function associated with the remedial action may be dependent on a degree or amount of deviation of the audio input from the established speech input pattern of the user. More particularly, a predetermined deviation threshold may exist (e.g., that is originally established by a programmer and that can later be adjusted by a user, etc.) for which a function associated with the remedial action may vary depending upon which side of the threshold the degree of deviation falls.

As a non-limiting example of the foregoing, the predetermined deviation threshold may bet set at the borderline between moderate and severe deviations. Responsive to identifying that the degree of deviation falls below this threshold, an embodiment may provide a notification to the user. This notification may be provided to the user via any conventional means (e.g., a visual notification presented on the user's display screen, an audible notification broadcast by one or more speakers, a combination thereof, etc.) and may remain active for as long as anomalous audio is detected. In an embodiment, the notification may contain a variety of different types of information. For example, the notification may inform the user that a predominant mute control (i.e., the primary mute control that acts enables or prevents audio input from being broadcast to others) is still active and/or that audio is being detected that is anomalous (i.e., that was not intended to be broadcast). Additionally or alternatively, the notification may contain an identification of the source of the anomalous audio (i.e., if the source is identifiable) and/or may contain one or more suggestions to the user to minimize the effect of the anomalous audio (e.g., "move to another room", "hold the microphone closer to your mouth", "turn off the object making the noise", etc.).

Responsive to identifying that the degree of deviation falls above the predetermined deviation threshold, an embodiment may prevent the received audio input from being broadcast. More particularly, an embodiment may dynamically activate, without receiving any additional user input, the predominant mute control. This activation may occur substantially immediately or, alternatively, may occur after a short countdown period (e.g., a five second countdown clock, etc.). An embodiment may also provide a user with a notification that informs them that the predominant mute control is now active and/or that the audio input is not being broadcast. During a period when the mute control is active, an embodiment may continue to receive/detect audio input. Despite not being broadcast, this audio input may continue to be analyzed and, responsive to identifying that anomalous audio is no longer present, or that a degree of the anomalous audio is under the predetermined deviation threshold, an embodiment may dynamically disable the mute control.

The various embodiments described herein thus represent a technical improvement to conventional methods for preventing unintended audio from being broadcast to others. Using the techniques described herein, an embodiment may first receive audio input at an audio input device. An embodiment may then determine that an audible anomaly exists in the audio input and may thereafter perform a remedial action to diminish or eliminate the negative effect that the audible anomaly may have on a call. For example, an embodiment may inform a user that an anomaly exists in the audio input. Alternatively, an embodiment may dynamically activate a predominant mute control so that the anomalous audio is not broadcast. Such a method may improve the quality of individual or conference calls by ensuring that a user is informed when anomalous audio is detected and/or by automatically preventing unintended audio from being broadcast to other individuals on a call.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    receiving, at an input device associated with an information handling device, audio input;
    determining, using a processor, that an audible anomaly exists in the audio input, wherein the audible anomaly corresponds to a deviation from an established speech input pattern of a user, wherein the determining comprises identifying audible characteristics associated with the audio input and determining, based on the identified characteristics, that the audio input contains human speech, wherein the determining comprises:
        identifying, using the processor, vocabulary utilized in the human speech and a frequency of words recited in the vocabulary, wherein the identifying comprises identifying that aspects of the audio input received are not associated with the human speech;
        comparing the vocabulary and the frequency of words recited in the vocabulary to at least one of: a call specific vocabulary and the established speech input pattern of the user; and
        establishing that the audible anomaly exists responsive to determining that at least one of the vocabulary and the frequency of words recited in the vocabulary are inconsistent with the established speech input pattern of the user, wherein the establishing the audible anomaly exists comprises:
            recording the aspects of the audio input received that are not associated with the human speech;
            assigning a point value to one or more particular words in the vocabulary utilized in the human speech based upon a commonality with known common words in the speech pattern of the user and call-specific vocabulary; and
            determining a total score associated with a relevancy of the audio input, wherein the relevancy comprises comparing the total score of the audio input to a predetermined threshold score; and
    performing, responsive to determining from the relevancy of the audio input that the audible anomaly exists, a remedial action to address the audible anomaly, wherein a function associated with the remedial action varies based upon a predetermined deviation threshold.

2. The method of claim 1, wherein a function associated with the remedial action is dependent on a degree of deviation of the audio input from the established speech input pattern of the user.

3. The method of claim 2, further comprising providing, responsive to identifying that the degree of deviation is less than a predetermined threshold deviation, a notification to the user.

4. The method of claim 2, further comprising preventing, responsive to identifying that the degree of deviation is greater than a predetermined threshold deviation, the audio input from being broadcast.

5. The method of claim 4, wherein the preventing comprises automatically activating, without receiving additional user input, a predominant mute control.

6. The method of claim 1, wherein the determining comprises establishing that the audible anomaly exists responsive to determining that the audio input comprises the non-speech noise.

7. The method of claim 1, wherein the determining comprises:
    identifying that the audio input comprises human speech;
    determining whether the human speech is associated with the user or another individual; and
    establishing that the audible anomaly exists responsive to determining that the human speech is associated with the another individual.

8. The method of claim 1, wherein the determining comprises:
    identifying a volume range of the audio input;
    comparing the volume range of the audio input to a known volume range of user's speech in the established speech input pattern; and
    establishing that the audible anomaly exists responsive to determining that a discrepancy exists between the volume range of the audio input and the known volume range of the user's speech in the established speech input pattern.

9. The method of claim 1, wherein the determining comprises:
    identifying that audio input comprises human speech;
    identifying a tone of the human speech;
    comparing the tone of the human speech in the audio input with a known tone of user's speech in the established speech pattern; and establishing that the audible anomaly exists responsive to determining that a discrepancy exists between the tone of the human speech in the audio input and the known tone the user's speech in the established speech pattern.

10. An information handling device, comprising:
an audio input device;
a processor;
a memory device that stores instructions executable by the processor to:
receive audio input;
determine that an audible anomaly exists in the audio input, wherein the audible anomaly corresponds to a deviation from an established speech input pattern of a user, wherein to determine comprises identifying audible characteristics associated with the audio input and determining, based on the identified characteristics, that the audio input contains human speech, wherein the determining comprises:
  identifying, using the processor, vocabulary utilized in the human speech and a frequency of words recited in the vocabulary, wherein the identifying comprises identifying that aspects of the audio input received are not associated with the human speech;
  comparing the vocabulary and the frequency of words recited in the vocabulary to at least one of: a call specific vocabulary and the established speech input pattern of the user; and
  establishing that the audible anomaly exists responsive to determining that at least one of the vocabulary and the frequency of words recited in the vocabulary are inconsistent with the established speech input pattern of the user, wherein the establishing the audible anomaly exists comprises:
    recording the aspects of the audio input received that are not associated with the human speech;
    assigning a point value to one or more particular words in the vocabulary utilized in the human speech based upon a commonality with known common words in the speech pattern of the user and call-specific vocabulary; and
    determining a total score associated with a relevancy of the audio input, wherein the relevancy comprises comparing the total score of the audio input to a predetermined threshold score; and
perform, responsive to determining from the relevancy of the audio input that the audible anomaly exists, a remedial action to address the audible anomaly, wherein a function associated with the remedial action varies based upon a predetermined deviation threshold.

11. The information handling device of claim 10, wherein a function associated with the remedial action is dependent on a degree of deviation from the established speech input pattern of the user.

12. The information handling device of claim 11, wherein the instructions are further executable by the processor to provide, responsive to identifying that the degree of deviation is less than a predetermined threshold deviation, a notification to the user.

13. The information handling device of claim 11, wherein the instructions are further executable by the processor to prevent, responsive to identifying that the degree of deviation is greater than a predetermined threshold deviation, the audio input from being broadcast, wherein the instructions executable by the processor to prevent comprise instructions executable by the processor to automatically activate, without receiving additional user input, a predominant mute control.

14. The information handling device of claim 10, wherein the instructions executable by the processor to determine comprise instructions executable by the processor to:
identify characteristics associated with the audio input;
determine, based on the identified characteristics, whether the audio input contains human speech or non-speech noise; and
establish that the audible anomaly exists responsive to determining that the audio input comprises the non-speech noise.

15. The information handling device of claim 10, wherein the instructions executable by the processor to determine comprise instructions executable by the processor to
identify that the audio input comprises human speech;
determine whether the human speech is associated with the user or another individual; and
establish that the audible anomaly exists responsive to determining that the human speech is associated with the another individual.

16. The information handling device of claim 10, wherein the instructions executable by the processor to determine comprise instructions executable by the processor to:
identify a volume range of the audio input;
compare the volume range of the audio input to a known volume range of user's speech in the established speech input pattern; and
establish that the audible anomaly exists responsive to determining that a discrepancy exists between the volume range of the audio input and the known volume range of the user's speech in the established speech input pattern.

17. The information handling device of claim 10, wherein the instructions executable by the processor to determine comprise instructions executable by the processor to:
identify that audio input comprises human speech;
identify a tone of the human speech;
compare the tone of the human speech in the audio input with a known tone of user's speech in the established speech pattern; and
establish that the audible anomaly exists responsive to determining that a discrepancy exists between the tone of the human speech in the audio input and the known tone the user's speech in the established speech pattern.

18. A product, comprising:
a storage device that stores code, the code being executable by a processor and comprising:
code that receives audio input;
code that determines that an audible anomaly exists in the audio input, wherein the audible anomaly corresponds to a deviation from an established speech input pattern of a user, wherein the code that determines comprises identifying audible characteristics associated with the audio input and determining, based on the identified characteristics, that the audio input contains human speech, wherein the determining comprises:
  identifying, using the processor, vocabulary utilized in the human speech and a frequency of words recited in the vocabulary, wherein the identifying comprises identifying that aspects of the audio input received are not associated with the human speech;
  comparing the vocabulary and the frequency of words recited in the vocabulary to at least one of: a call specific vocabulary and the established speech input pattern of the user;
  establishing that the audible anomaly exists responsive to determining that at least one of the vocabulary and the frequency of words recited in the vocabulary are inconsistent with the established speech input pattern of the user, wherein the establishing the audible anomaly exists comprises:
recording the aspects of the audio input received that are not associated with the human speech;
assigning a point value to one or more particular words in the vocabulary utilized in the human speech based upon a commonality with known common words in the speech pattern of the user and call-specific vocabulary; and
determining a total score associated with a relevancy of the audio input, wherein the relevancy comprises comparing the total score of the audio input to a predetermined threshold score; and
code that performs, responsive to determining from the relevancy of the audio input that the audible anomaly exists, a remedial action to address the audible anomaly, wherein a function associated with the remedial action varies based upon a predetermined deviation threshold.

* * * * *